US012781059B2

(12) United States Patent
Kang et al.

(10) Patent No.: US 12,781,059 B2
(45) Date of Patent: Nov. 3, 2026

(54) COMPOSITION FOR METAL COATING INHIBITING HYDROGEN EMBRITTLEMENT AND METAL WITH HYDROGEN BRITTLE INHIBITION COATING LAYER

(71) Applicant: PUSAN NATIONAL UNIVERSITY INDUSTRY-UNIVERSITY COOPERATION FOUNDATION, Busan (KR)

(72) Inventors: Nam Hyun Kang, Busan (KR); Sourav Kumar Saha, Busan (KR); Byung Rok Moon, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 213 days.

(21) Appl. No.: 18/729,456

(22) PCT Filed: Jan. 19, 2024

(86) PCT No.: PCT/KR2024/000936

§ 371 (c)(1),
(2) Date: Jul. 16, 2024

(87) PCT Pub. No.: WO2024/172313

PCT Pub. Date: Aug. 22, 2024

(65) Prior Publication Data

US 2026/0176476 A1 Jun. 25, 2026

(30) Foreign Application Priority Data

Feb. 17, 2023 (KR) ........................ 10-2023-0021447

(51) Int. Cl.
*C09D 5/08* (2006.01)

(52) U.S. Cl.
CPC .................................... *C09D 5/084* (2013.01)

(58) Field of Classification Search
None
See application file for complete search history.

(56) References Cited

U.S. PATENT DOCUMENTS

2003/0234063 A1* 12/2003 Sturgill .................. C23C 22/68
148/273
2014/0030425 A1* 1/2014 Owei ..................... C23C 22/63
252/400.1
2022/0240511 A1* 8/2022 Chang .................... A01N 25/04

* cited by examiner

*Primary Examiner* — Sheeba Ahmed
(74) *Attorney, Agent, or Firm* — NORTON ROSE FULBRIGHT US LLP

(57) ABSTRACT

The present invention relates to a hydrogen embrittlement-inhibiting composition for coating a metal, wherein the composition contains 6-BAP. A thin coating layer containing 6-BAP is formed on the metal surface, such that hydrogen is prevented from being adsorbed on the metal surface, and hydrogen is effectively prevented from invading into the metal.

7 Claims, 8 Drawing Sheets

COMPOSITION FOR METAL COATING INHIBITING HYDROGEN EMBRITTLEMENT AND METAL WITH HYDROGEN BRITTLE INHIBITION COATING LAYER

CROSS-REFERENCE TO RELATED APPLICATIONS

The present application is a national phase application under 35 U.S.C. § 371 of International Application No. PCT/KR2024/000936 filed Jan. 19, 2024, which claims the benefit of priority to Korean Patent Application No. 10-2023-0021447, filed Feb. 17, 2023. The entire contents of each of the referenced patent applications are incorporated into the present application by reference.

BACKGROUND

Field of the Disclosure

The present disclosure relates to suppressing hydrogen embrittlement of a metal. More specifically, the present disclosure relates to a hydrogen embrittlement-inhibiting composition for coating a metal that is easily adsorbed to a metal surface and forms a thin film to prevent hydrogen adsorption and penetration, and to a metal onto which the composition is introduced.

Description of Related Art

The global trend to replace fossil fuels with cleaner, renewable energy sources is rapidly requiring the development of hydrogen-based energy resources. In line with this trend, fossil fuels in the automotive industry will be completely replaced with hydrogen-based energy sources, so that current storage and transportation facilities should efficiently store therein larger amounts of hydrogen. In addition, most material parts used in the ocean and deep sea require superior mechanical properties. Thus, high-strength steel used in various industries is utilized in the most material parts used in the ocean and deep sea. In addition, high-strength steel exposed to the harsh marine environment should exhibit mechanical and chemical properties in a hydrogen atmosphere.

Austenitic stainless steel which is known to have stronger resistance to hydrogen embrittlement than general steel, is usually used in places exposed to a hydrogen atmosphere. However, austenitic stainless steel has an economic disadvantage because it is a steel containing expensive alloy elements such as Ni and Cr. Therefore, it is very important to develop high-strength steel structural materials with low susceptibility to hydrogen embrittlement under harsh hydrogen environments, and excellent economic efficiency.

When equipment or components made of steel structural materials operate in a hydrogen environment, the most important concern is hydrogen embrittlement. When hydrogen atoms are adsorbed on the metal surface, diffuse into the metal, and react with the microstructure, embrittlement occurs, which rapidly reduces the most important mechanical properties such as ultimate tensile strength, elongation, fracture toughness, and fatigue failure propagation velocity. In this way, the hydrogen embrittlement phenomenon directly and indirectly affects facilities, the environment, and even people. However, steel structural materials used in extreme environments require high-strength mechanical properties, so that hydrogen embrittlement inevitably occurs. In addition to developing high-strength steel with low susceptibility to hydrogen embrittlement, it is also important to consider developing methods to fundamentally suppress the generation and penetration of hydrogen.

The existing methods to prevent the hydrogen from penetrating into steel structural materials include the use of polymer and plastic-based inhibitors, coating by electrodeposition, and finally, the use of metal hydrates. However, the polymer and plastic-based inhibitors have the disadvantages of high price, environmental pollution, and difficulty in applying them to the actual environment. The coating by electrodeposition has a serious disadvantage in that local damage to the coating accelerates corrosion and hydrogen embrittlement after the coating. Lastly, the production of the metal hydrates should be performed at inaccessible high temperatures (e.g. 800° C.), which weakens the mechanical properties of steel structural materials and thus may only be used in a limited way depending on the material. Therefore, it is necessary to develop a method for suppressing the hydrogen embrittlement that effectively reduces the susceptibility to hydrogen embrittlement, is more economical, environmentally friendly, easier to work with, and has fewer restrictions on material selection.

SUMMARY OF THE INVENTION

A purpose of the present disclosure is to provide a suitable composition that is easily adsorbed to the metal surface and prevents penetration and migration of hydrogen into the metal to suppress the hydrogen embrittlement phenomenon.

Another purpose of the present disclosure is to provide a metal with improved hydrogen embrittlement resistance, including a coating layer preventing hydrogen adsorption and penetration on a surface thereof.

A hydrogen embrittlement-inhibiting composition for coating a metal to achieve one purpose of the present disclosure comprises 6-BAP (6-Benzylaminopurine) represented by a following Chemical Formula 1.

Chemical Formula 1

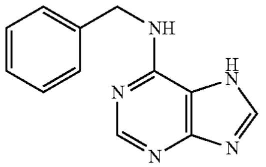

6-BAP and 2-MBI (2-Mercaptobenzimidazole) are generally used to inhibit metal corrosion. However, the technology used to suppress hydrogen embrittlement of metals using the 6-BAP has not yet been studied. Accordingly, the inventor of the present disclosure has discovered that 6-BAP which is used for metal corrosion provides a novel effect of preventing the formation and adsorption of hydrogen on the metal surface to prevent hydrogen from penetrating into the metal. Accordingly, 6-BAP is used as a composition that suppresses hydrogen embrittlement of metals. Since the 6-BAP is easily adsorbed on metal surfaces, the 6-BAP may be used as a metal coating composition to suppress hydrogen embrittlement, and further may also be used as an additive in industrial processes. For example, in several manufacturing processes, acid solutions are used in numerous technologies, including rust removal from metals, pickling, oil well acidizing, acid descaling, boiler cleaning, and petrochemical industry processes. During the process, hydrogen atoms enter the interior of the metal material and induce hydrogen embrittlement. In these industrial processes, the application of 6-BAP as an additive to the acid solution may reduce hydrogen penetrating into the material.

In one embodiment, a content of 6-BAP is in a range of 3 to 5 mM based on a total content of the composition.

A metal having a hydrogen embrittlement-inhibiting coating layer formed on a surface thereof to achieve another purpose of the present disclosure comprises the metal; and the hydrogen embrittlement-inhibiting coating layer formed on the surface of the metal, wherein the hydrogen embrittlement-inhibiting coating layer contains 6-BAP.

In one embodiment of the metal having the hydrogen embrittlement-inhibiting coating layer formed on the surface thereof, the hydrogen embrittlement-inhibiting coating layer is formed by immersing the metal in a coating solution in which the 6-BAP is added to a sodium hydroxide or methanol solvent.

In this regard, the immersion time may vary depending on the solvent used. For example, when sodium hydroxide is used as the solvent, the immersion may be performed for about 20 to 30 hours. When methanol is used as the solvent, the immersion may be performed for about 50 to 80 hours. Preferably, when sodium hydroxide is used as the solvent, the immersion may be performed for about 24 hours. When methanol is used as the solvent, the immersion may be performed for about 72 hours.

A thickness of the coating layer may be in a range of about several to hundreds of nm. However, the present disclosure is not necessarily limited to this value.

In the metal having the hydrogen embrittlement-inhibiting coating layer formed on the surface thereof, a content of 6-BAP is in a range of 3 to 5 mM based on a total content of the coating solution.

According to the present disclosure, the thin coating layer containing 6-BAP may be formed on the metal surface, thereby effectively preventing the adsorption of hydrogen on the metal surface and the penetration of hydrogen into the metal.

DETAILED DESCRIPTION OF THE INVENTION

Figure 1:
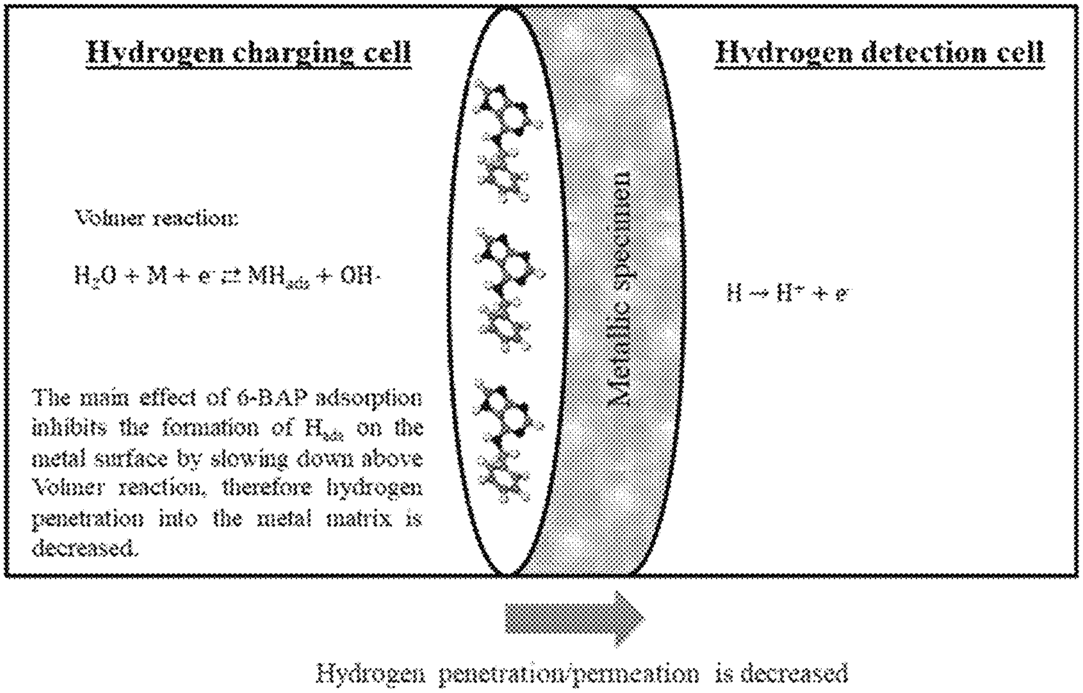
FIG. 1 is a diagram for illustrating a hydrogen embrittlement-inhibiting composition for coating a metal, and a metal having a hydrogen embrittlement-inhibiting coating layer formed thereon in accordance with the present disclosure, and shows an effect of 6-BAP on the adsorption and permeation of hydrogen.

Hereinafter, embodiments of the present disclosure will be described in detail with reference to the accompanying drawings. The present disclosure may be subjected to various changes and may have various forms. Thus, particular embodiments will be illustrated in the drawings and will be described in detail herein. However, this is not intended to limit the present disclosure to a specific disclosed form. It should be understood that the present disclosure includes all modifications, equivalents, and replacements included in the spirit and technical scope of the present disclosure. While describing the drawings, similar reference numerals are used for similar components.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "including", "include", and "including" when used in this specification, specify the presence of the stated features, integers, operations, elements, and/or components, but do not preclude the presence or addition of one or more other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The adsorption of hydrogen on the surface of a metal material and penetration thereof into the metal may be explained based on a following reaction. It may be assumed that reduction of hydrogen ions occurs on the surface of the metal material according to a two-step adsorption mechanism involving intermediates.

The first step is the hydrogen adsorption step. (Volmer reaction)

[Reaction Formula 1]

$$H_3O^+ + M + e^- \longleftrightarrow MH_{ads} + H_2O \text{ (in acidic media)}$$

On the other hand, in an alkaline solution, dissociation of $H_2O$ provides adsorbed hydrogen:

[Reaction Formula 2]

$$H_2O + M + e^- \longleftrightarrow MH_{ads} + OH^- \text{ (in alkaline media)}$$

The adsorbed hydrogen is produced as gaseous hydrogen through two different steps:

(i) Electrochemical desorption (Heyrovsky reaction)

[Reaction Formula 3]

$$MH_{ads} + H^{+} + e^{-} \longleftrightarrow M + H_2$$

(ii) Chemical recombination (Tafel reaction)

[Reaction Formula 4]

$$2MH_{ads} \longleftrightarrow 2M + H_2$$

Following the hydrogen adsorption reaction on the surface of the metal material, some of the adsorbed hydrogens penetrates into the metal. This means that hydrogen penetrates into a layer just under the metal surface. Thus, as shown below, the two states of hydrogen atoms, namely, adsorbed hydrogen ($H_{ads}$) and absorbed hydrogen ($H_{abs}$) may react reversibly with each other.

[Reaction Formula 5]

$$MH_{ads} + M_{subsurface} \longleftrightarrow M_{surface} + MH_{abs}\text{ (subsurface)}$$

Afterwards, the absorbed hydrogen atoms diffuse into the bulk metal.

[Reaction Formula 6]

$$MH_{abs}\text{(subsurface)} \longrightarrow \text{diffusion} \longrightarrow MH_{abs}\text{(bulk)}$$

In the above Reaction Formulas (1) to (6), M is the adsorption site of hydrogen on the metal surface, $MH_{ads}$ is the hydrogen adsorbed on the metal surface, $H_{abs}$ is hydrogen permeated into the metal, $M_{subsurface}$ is the layer immediately under the metal surface, and $M_{surface}$ is the metal surface.

It has been described above that hydrogen penetrates into the metal after the hydrogen adsorption reaction. In the following, the role of 6-BAP material in this hydrogen adsorption and permeation reaction will be described with reference to FIG. 1.

Referring to FIG. 1, 6-BAP molecules easily adsorb to metal surfaces. 6-BAP covers the potential sites of hydrogen formation as well as hydrogen adsorption on the metal surface. Therefore, the entire reaction equation 2 is slowed down by 6-BAP, and as a result, hydrogen permeation inside the metal is reduced.

According to the present disclosure, the susceptibility to hydrogen embrittlement may be lowered by controlling the diffusion of hydrogen that invades/penetrates into the metal material. In order to achieve this goal, 6-BAP is used, which is easily adsorbed to the metal surface and forms a thin film to suppress surface adsorption of hydrogen atoms ($H_{ads}$) and intrusion into the material for a long time (24-1440 h).

In the following, 2-MBI material, which is widely used together with 6-BAP for metal corrosion inhibition, is used as a comparison group to demonstrate that only 6-BAP among materials used as corrosion inhibitors can specifically inhibit hydrogen embrittlement. In this regard, the present disclosure will be described in more detail through the following examples and experimental results thereof.

MODES

Example

1. Materials

6-Benzylaminopurine (6-BAP) and 2-Mercaptobenzimidazole (2-MBI) were purchased from Daejung Chemicals and Sigma-Aldrich, respectively.

6-Benzylaminopurine (6-BAP): CAS Number 583-39-1

2-Mercaptobenzimidazole (2-MBI): CAS Number 1214-39-7

2. Experimental Method

The electrochemical hydrogen permeation test, the X-Ray Photoelectron Spectroscopy (XPS), and the in-situ slow strain rate testing (in-situ SSRT) are conducted as follows.

Electrochemical Hydrogen Permeation Test

Figure 2:
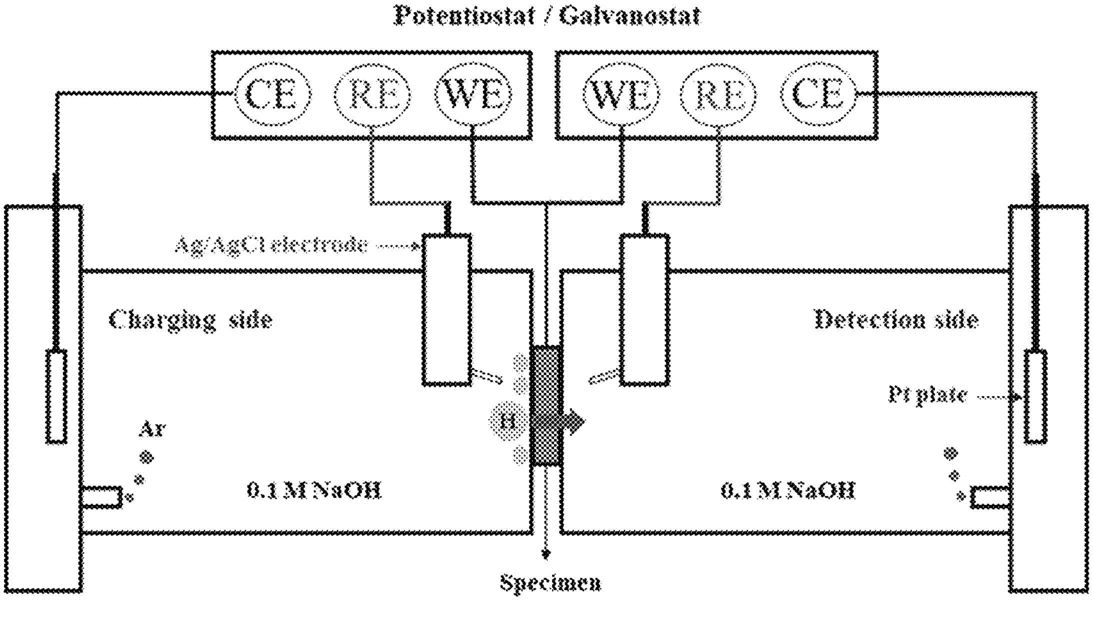
FIG. 2 is a schematic diagram of an apparatus for an electrochemical hydrogen permeation test to evaluate the effect of 6-BAP on hydrogen adsorption and permeation in accordance with the present disclosure.

FIG. 2 is a schematic diagram of the apparatus for the electrochemical hydrogen permeation test in accordance with the present disclosure.

Referring to FIG. 2, the electrochemical hydrogen permeation test in accordance with the present disclosure is performed with a Devanathan-Stachurski cell modified according to the ISO 17081 standard. Before the electrochemical hydrogen permeation test, both opposing surfaces of the specimen were mechanically polished to #2400 SiC level to achieve a final specimen thickness of 500±10 μm, and the exposed surface area of the specimen was ~78.5 $mm^2$. All electrochemical hydrogen permeation tests were performed at room temperature (295 K) using potentiostat and galvanostat (Autolab PGSTAT302F, Metrohm, Switzerland) equipment. The electrolyte of each of the hydrogen charging cell and the hydrogen detection cell is a 0.1 M NaOH aqueous solution. To investigate the role of 2-MBI and 6-BAP in the hydrogen permeation test, different concentrations of 2-MBI and 6-BAP were added.

In particular, additional experiments were conducted to identify the adsorption behavior of 6-BAP. The specimen was immersed in a 5 mM methanol solution containing 6-BAP for 72 hours, and the hydrogen charging cell and hydrogen detection cell were prepared with 0.1 M NaOH aqueous solution, and then a hydrogen permeation test was performed on the immersed specimen. Hydrogen was electrochemically generated by applying a current density of 0.5 $mA/cm^2$ to the cathode (reduction reaction) of the specimen, while hydrogen was detected by applying a constant voltage of +250 mV compared to the Ag/AgCl (3 M KCl) reference electrode to the anode (oxidation reaction) of the specimen. A platinum (Pt) sheet was used as the counter electrode in each of both cells. When the current reached sufficiently low levels according to ISO standards, the hydrogen curve began to rise.

The method for identifying the results of the electrochemical hydrogen permeation test is as follows.

Diffusion of hydrogen atoms in metal is the most important factor determining hydrogen embrittlement (HE) behavior. The adsorption of organic molecules on the metal surface causes significant changes in hydrogen diffusion and hydrogen trapping inside the specimen. The following variables are important to determine hydrogen permeation results:

At the beginning of the hydrogen permeation test, the current density increases rapidly, and after reaching a steady-state, when the applied current to the hydrogen charging cell is stopped, the current in the hydrogen detection cell decreases. From the current change in this hydrogen permeation test, the effective hydrogen diffusion coefficient ($D_{eff}$) and the hydrogen concentration ($C_0$) inside the specimen may be obtained using Equations 1 and 2 below:

$$D_{eff} = \frac{L^2}{6 \times t_{lag}} \quad \text{[Equation 1]}$$

$$C_0 = \frac{L \times I_{ss}}{F \times D_{eff}} \quad \text{[Equation 2]}$$

In Equations 1 and 2 above, L represents the thickness of the specimen (m), $I_{ss}$ represents the current density (μA/m$^2$) in a steady state, and F represents the Faraday constant (C/mol). Time lag ($t_{lag}$) is the time when the current is 0.63 ($I(t)/I_{ss}=0.63$) of the steady-state current density.

Metals containing more hydrogen concentration ($C_0$) inside are more susceptible to hydrogen embrittlement. Based on a comparing result between the hydrogen concentrations ($C_0$) depending on the presence or absence of organic molecules, the effect (η) of the organic molecules may be evaluated as follows:

$$\eta = \left[\frac{C_0 - C_0^{inh}}{C_0}\right] \times 100 \quad \text{[Equation 3]}$$

In Equation 3, $C_0$ and $C_0^{inh}$ represent the hydrogen concentration inside the material when organic molecules are not present and when organic molecules are present, respectively.

X-Ray Photoelectron Spectroscopy (XPS)

XPS analysis was performed to identify the adsorption behavior of 6-BAP on the metal surface. Each specimen taken out of the solution was washed with ethanol and dried in an air atmosphere at room temperature. Then, it was analyzed using X-ray photoelectron spectroscopy (XPS) using monochromatic Al Kα X-ray (Axis Supra, Kratos Analytical). XPS spectra were analyzed using Casa XPS software.

In-Situ Slow Strain Rate Testing (In-Situ SSRT)

In-situ slow strain rate testing with and without hydrogen charging is used to evaluate the susceptibility of the metal to hydrogen embrittlement. Specimens for the slow strain rate test were prepared in the rolling direction without notches according to the sub-size specifications of ASTM E8. The area within the gauge length of the specimen was finally polished with #2400 grade SiC, and hydrogen was electrochemically charged into the specimen in a 0.1 M NaOH aqueous solution. In addition, to investigate the effect of 6-BAP on hydrogen embrittlement, a 5 mM 6-BAP solution was prepared by adding 6-BAP thereto. To prevent hydrogen from being released from the specimen and to simulate the real-time hydrogen charging phenomenon during tensile plastic deformation, in-situ SSRT was performed under the same hydrogen charging conditions 24 hours after hydrogen charging. All SSRT tests were conducted with a universal tensile tester (AG-IC/100 KN, Shimadzu. Japan), and the cross-head moving speed was $2.5\times10^{-4}$ mm/s ($10^{-5}$/s, slow stain rate).

To quantify hydrogen embrittlement susceptibility, the cross-sectional area reduction after SSRT was measured and the HE index may be obtained as follows:

$$HE\ \text{index} = \left[\frac{RoA_{HF} - RoA_{HC}}{RoA_{HF}}\right] \times 100 \quad \text{[Equation 4]}$$

In Equation 4 above, $RoA_{HF}$ and $RoA_{HC}$ refer to the cross-sectional area reduction after SSRT when hydrogen is not charged (hydrogen free, HF) and the cross-sectional reduction after SSRT when hydrogen is charged (hydrogen charged, HC), respectively.

3. Evaluation of Experimental Results

Figure 3:
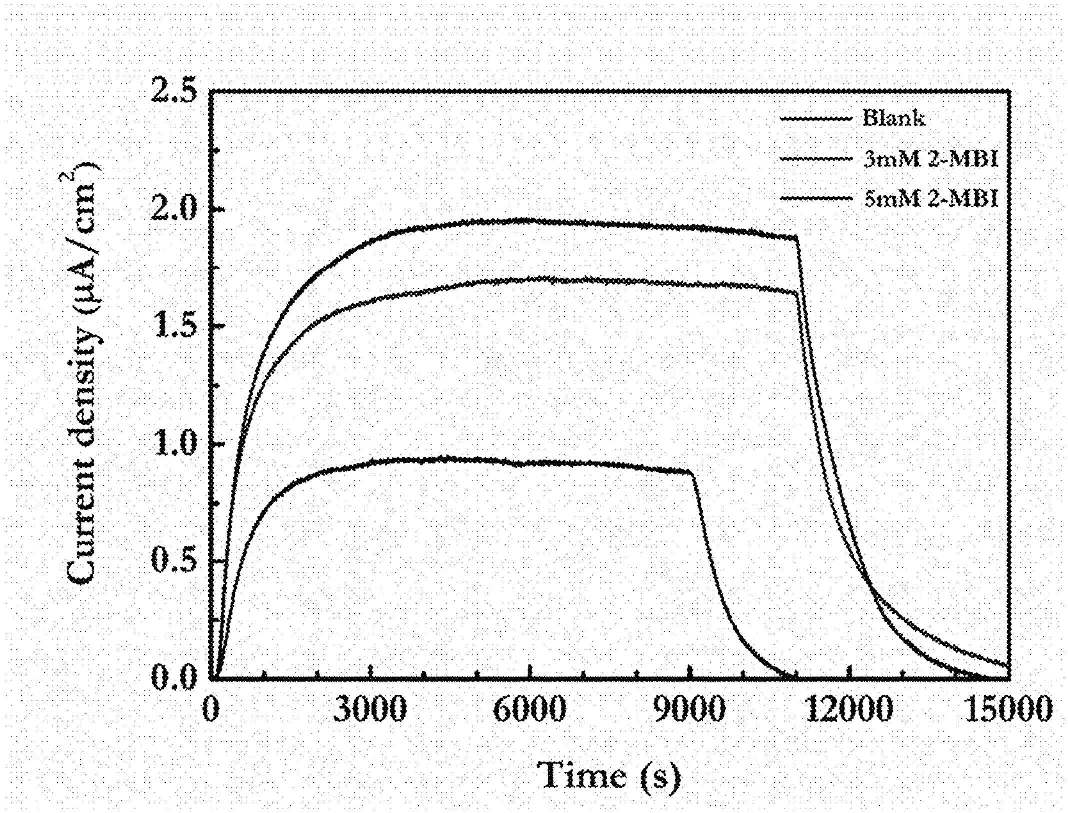
FIG. 3 is a diagram showing the results of the hydrogen permeation test with and without 2-MBI.

FIG. 3 is a diagram showing the results of the hydrogen permeation test with and without 2-MBI.

Referring to FIG. 3, it shows the results of a hydrogen permeation test conducted with solutions of various concentrations (0≤2-MBI≤5 mM) by adding 2-MBI to 0.1 M NaOH electrolyte (hydrogen charging cell). It may be identified that the steady-state current density ($I_{ss}$) in 0.1 M NaOH electrolyte (blank) without 2-MBI is significantly lower than in the other two cases with 2-MBI added thereto. This means that 2-MBI significantly changes the hydrogen concentration ($C_0$) inside the specimen. In order to establish this fact, $D_{eff}$ and $C_0$ were calculated according to Equations 1 and 2 above, and the results are shown in Table 1.

TABLE 1

| System | $D_{eff}$ (m$^2$/s) | $C_0$ (mol/m$^3$) |
|---|---|---|
| Blank | $5.87 \times 10^{-11}$ | 0.83 |
| 3 mM 2-MBI | $5.62 \times 10^{-11}$ | 1.51 |
| 5 mM 2-MBI | $5.21 \times 10^{-11}$ | 1.92 |

Referring to Table 1, it may be identified that the hydrogen diffusion coefficient is almost constant at the level of $10^{-11}$ m$^2$/s, and the hydrogen concentration ($C_0$) inside the specimen increases significantly with the addition of 2-MBI. For 5 mM 2-MBI, the hydrogen concentration ($C_0$) increased from 0.83 mol/m$^3$ to 1.92 mol/m$^3$. This means that 2-MBI is adsorbed to the metal and promotes hydrogen penetration into the metal. Thus, it was identified that 2-MBI accelerates the hydrogen embrittlement phenomenon.

Figure 4A:
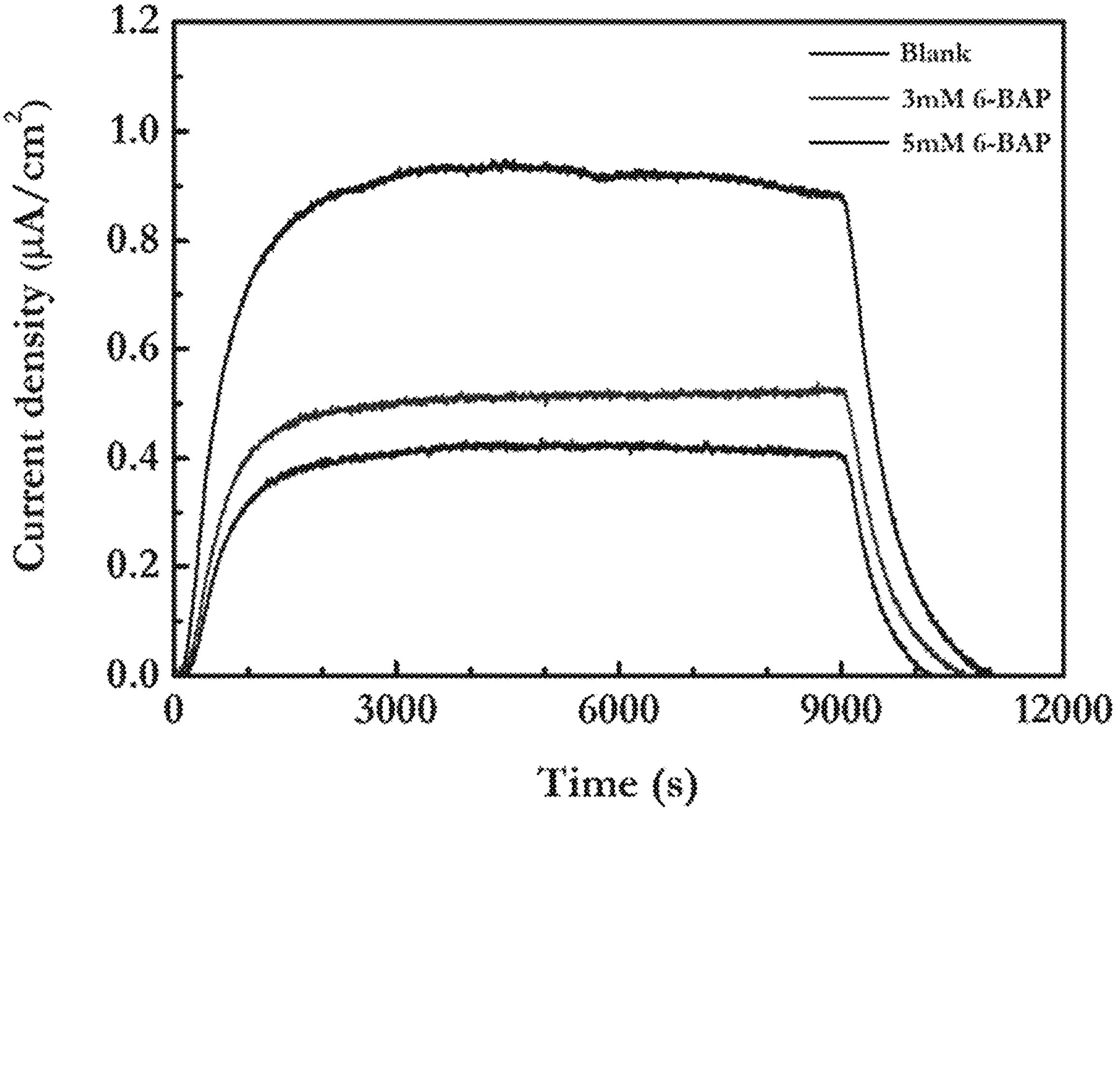
FIG. 4A shows the results of a hydrogen permeation test conducted with solutions of various concentrations (0≤6-BAP≤5 mM) obtained by adding 6-BAP to the electrolyte (hydrogen charging cell).
Figure 4B:
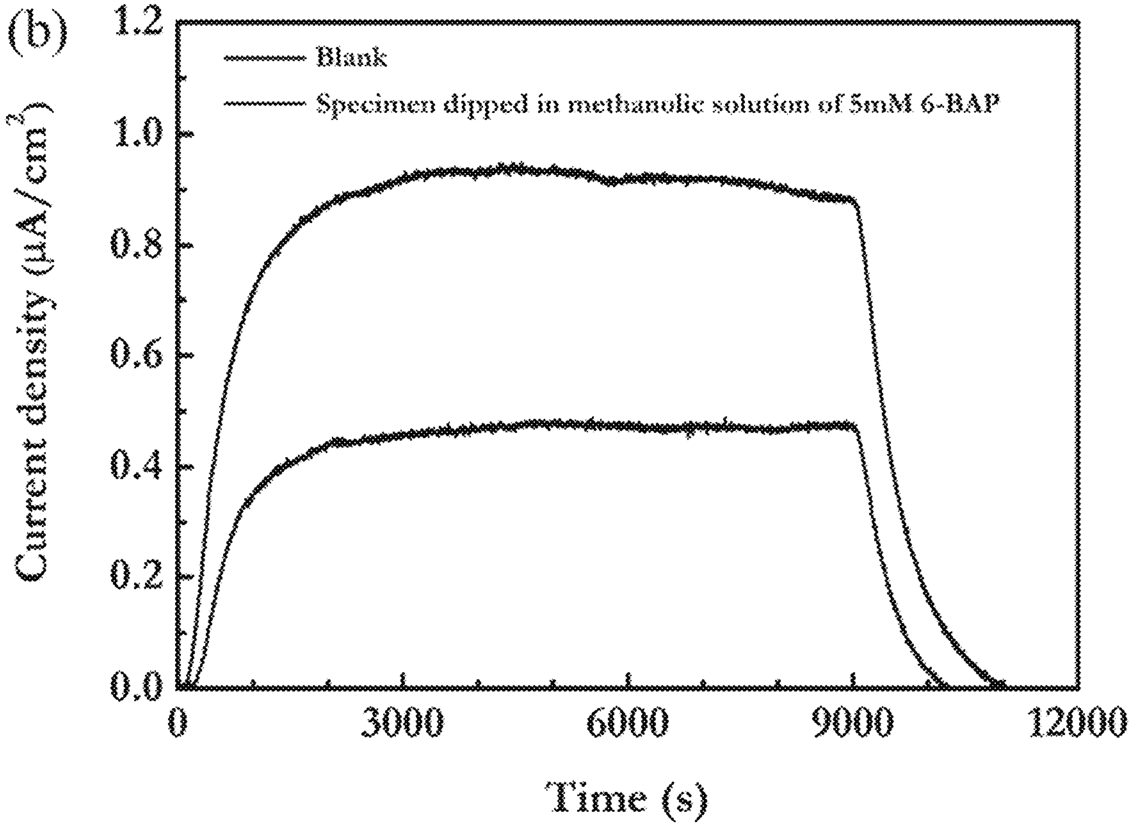
FIG. 4B shows the results of a hydrogen permeation test after immersing the specimen in a methanol solution with a concentration of 5 mM 6-BAP for 72 hours.

FIG. 4A shows the results of a hydrogen permeation test conducted with solutions of various concentrations (0≤6-BAP≤5 mM) obtained by adding 6-BAP to the electrolyte (hydrogen charging cell). FIG. 4B shows the results of a hydrogen permeation test after immersing the specimen in a methanol solution with a concentration of 5 mM 6-BAP for 72 hours.

Referring to FIG. 4, it may be identified that the steady-state current density decreased significantly with the application of 6-BAP. This is a signal that the hydrogen concentration inside the specimen has decreased. Based on FIG. 4A, it was observed that the hydrogen concentration in the 5 mM 6-BAP solution decreased from 0.83 mol/m$^3$ to 0.40 mol/m$^3$.

In addition, as shown in FIG. 4B, when the specimen immersed in a methanol solution of 5 mM 6-BAP for 72 hours was taken out therefrom and tested in 0.1 M NaOH electrolyte, the hydrogen concentration inside the specimen decreased from 0.83 mol/m$^3$ to 0.45 mol/m$^3$.

These results show that 6-BAP is adsorbed on the metal surface and forms a thin film that suppresses hydrogen penetration into the interior by inhibiting the formation and adsorption of hydrogen atoms ($H_{ads}$).

The hydrogen permeation test results calculated using Equations 1 and 2 above are shown in Table 2.

TABLE 2

| System | $D_{eff}$($m^2$/s) | $C_0$(mol/$m^3$) | Efficiency(η %) |
|---|---|---|---|
| Blank | $5.87 \times 10^{-11}$ | 0.83 | — |
| 3 mM 6-BAP | $5.60 \times 10^{-11}$ | 0.47 | 43.4 |
| 5 mM 6-BAP | $5.44 \times 10^{-11}$ | 0.40 | 51.8 |
| Specimen immersed in methanol solution with 5 mM 6-BAP concentration for 72 hours | $5.29 \times 10^{-11}$ | 0.45 | 45.8 |

Referring to the above description (see FIG. 1), BAP organic material adsorbs to the metal surface and may cover sites where hydrogen may be formed as well as hydrogen may be adsorbed. Therefore, the adsorption reaction of hydrogen is slowed down by the 6-BAP inhibitor. As a result, it may be identified that hydrogen permeation/penetration into the metal decreases.

FIG. 5 is a diagram showing the XPS spectrum of each of (i) a polished metal specimen, (ii) a polished specimen which has been immersed for 24 hours in a 5-mM concentration 6-BAP solution prepared by adding 6-BAP to a 0.1 M NaOH aqueous solution, (iii) a polished specimen which has been immersed in a methanol solution with a 5 mM 6-BAP concentration for 72 hours, and (iv) a polished specimen taken out of a methanol solution with a 5 mM 6-BAP concentration and exposed to air for 30 days.

Figure 5A:
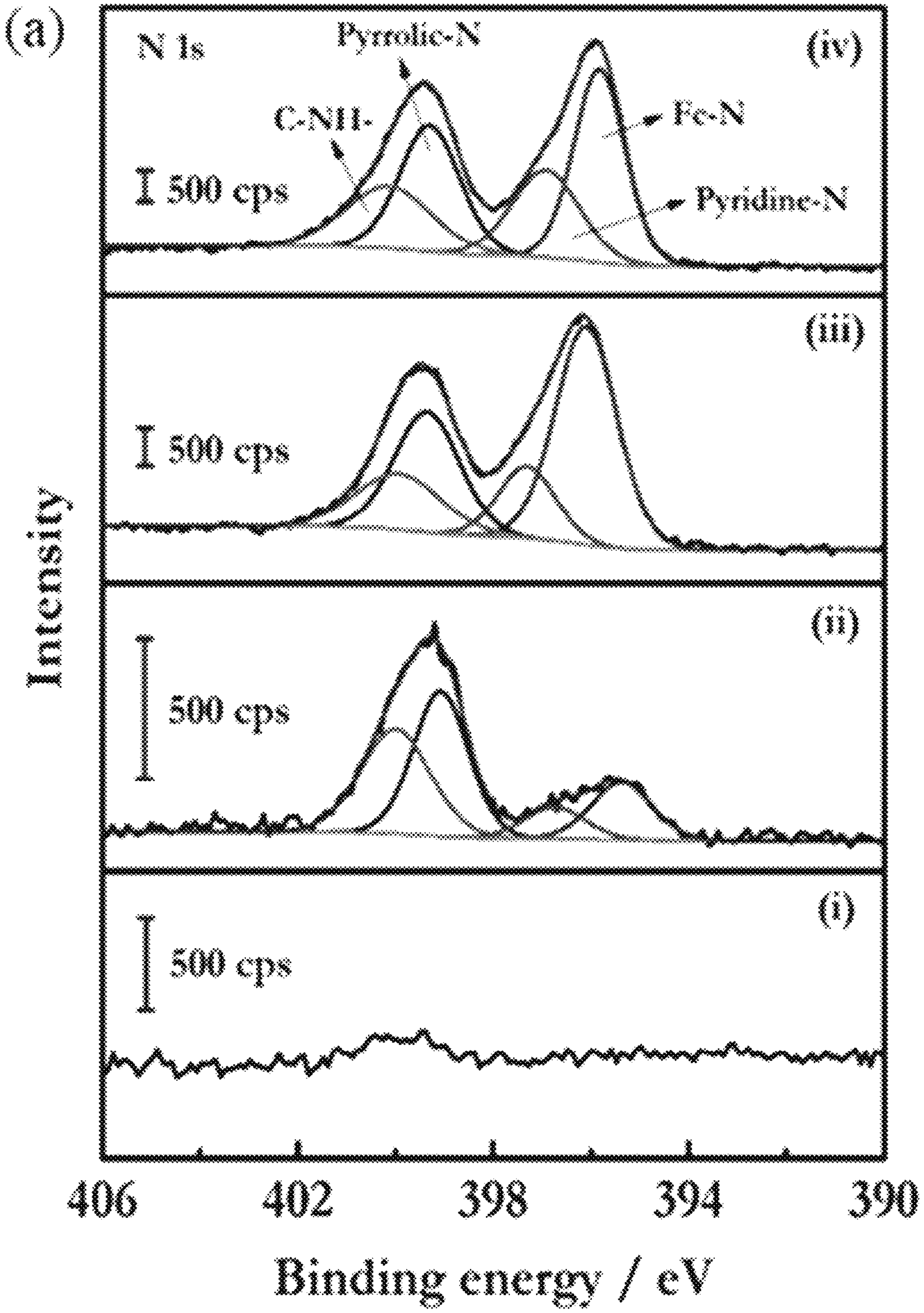
FIG. 5A-FIG. 5C is a diagram showing the XPS spectrum of each of (i) a polished metal specimen, (ii) a polished specimen which has been immersed for 24 hours in a 5-mM concentration 6-BAP solution prepared by adding 6-BAP to a 0.1 M NaOH aqueous solution, (iii) a polished specimen which has been immersed in a methanol solution with a 5 mM 6-BAP concentration for 72 hours, and (iv) a polished specimen taken out of a methanol solution with a 5 mM 6-BAP concentration and exposed to air for 30 days.

In FIG. 5A, the polished metal specimen (i) does not contain the N 1s peak, whereas the specimen (ii) immersed in a 0.1 M NaOH solution with a concentration of 5 mM 6-BAP for 24 hours shows the N 1s peak. This means adsorption of 6-BAP on the metal surface. In addition, in the specimen (iii) soaked in a methanol solution of 5 mM 6-BAP for 72 hours, an N is peak was observed, thus indicating that 6-BAP was also adsorbed on the metal surface. To determine whether FIG. 6-BAP is still adsorbed to the metal surface after prolonged exposure to air, the polished specimen (iv) was taken out of a methanol solution with a 5 mM 6-BAP concentration and was exposed to air for 30 days and was subjected to XPS analysis. The identified N is peak means that the adsorption behavior of 6-BAP is still maintained. Additionally, the N is peak may be deconvoluted into C—NH— (~400.1 eV), Pyrorolic-N(~399.2 eV), and Fe—N(~395.7 eV), and the N is peak is due to the 6-BAP adsorbed on the surface.

Figure 5B:
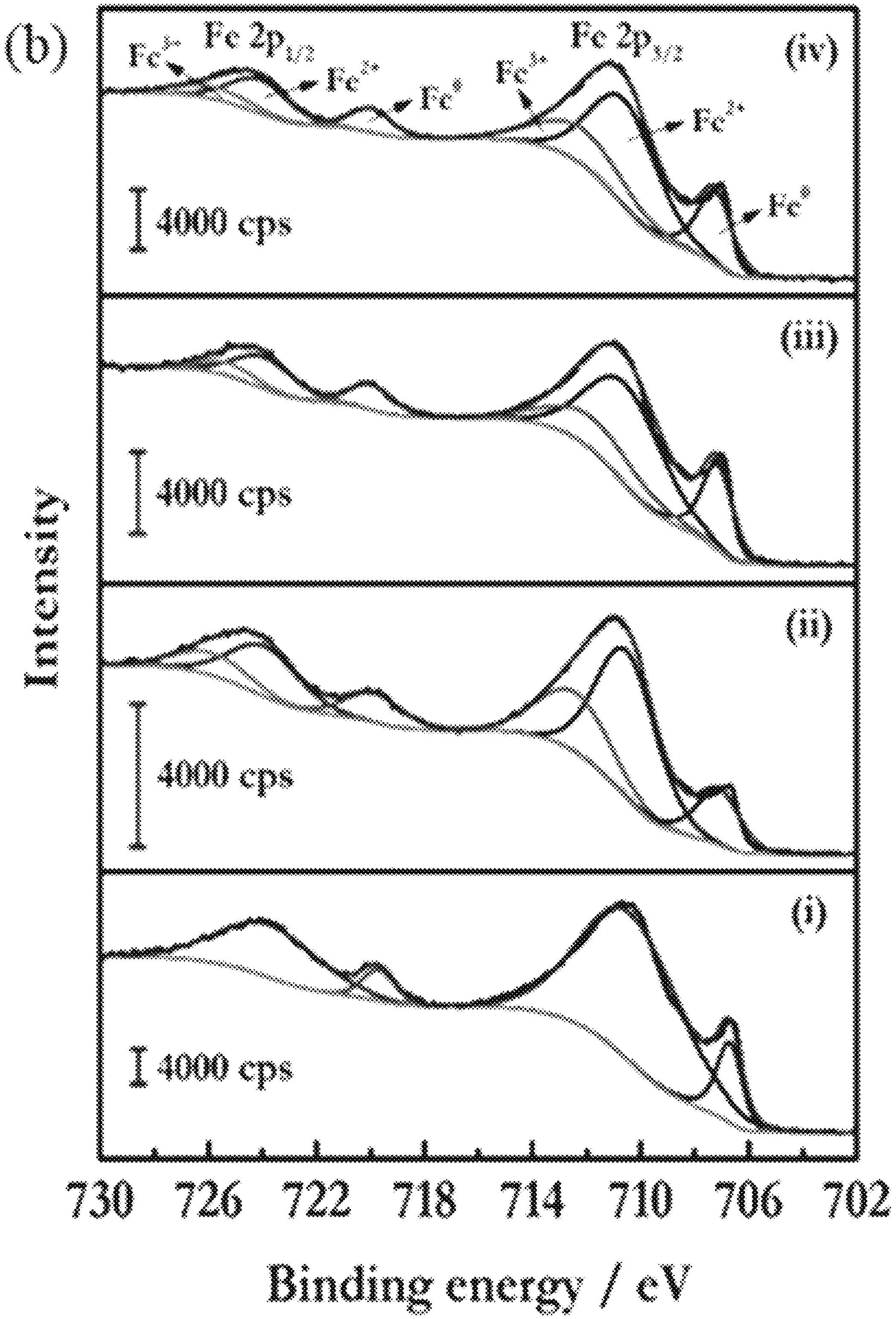

FIG. 5B shows Fe $2p_{3/2}$ peaks located at ~707 and ~711 eV, respectively and Fe $2p_{1/2}$ peaks located at ~720 and ~724 eV. The Fe $2p_{3/2}$ peak is deconvoluted into ~707.2, ~710.9, and ~712.8 eV peaks corresponding to metal, divalent, and trivalent ions, respectively.

Figure 5C:
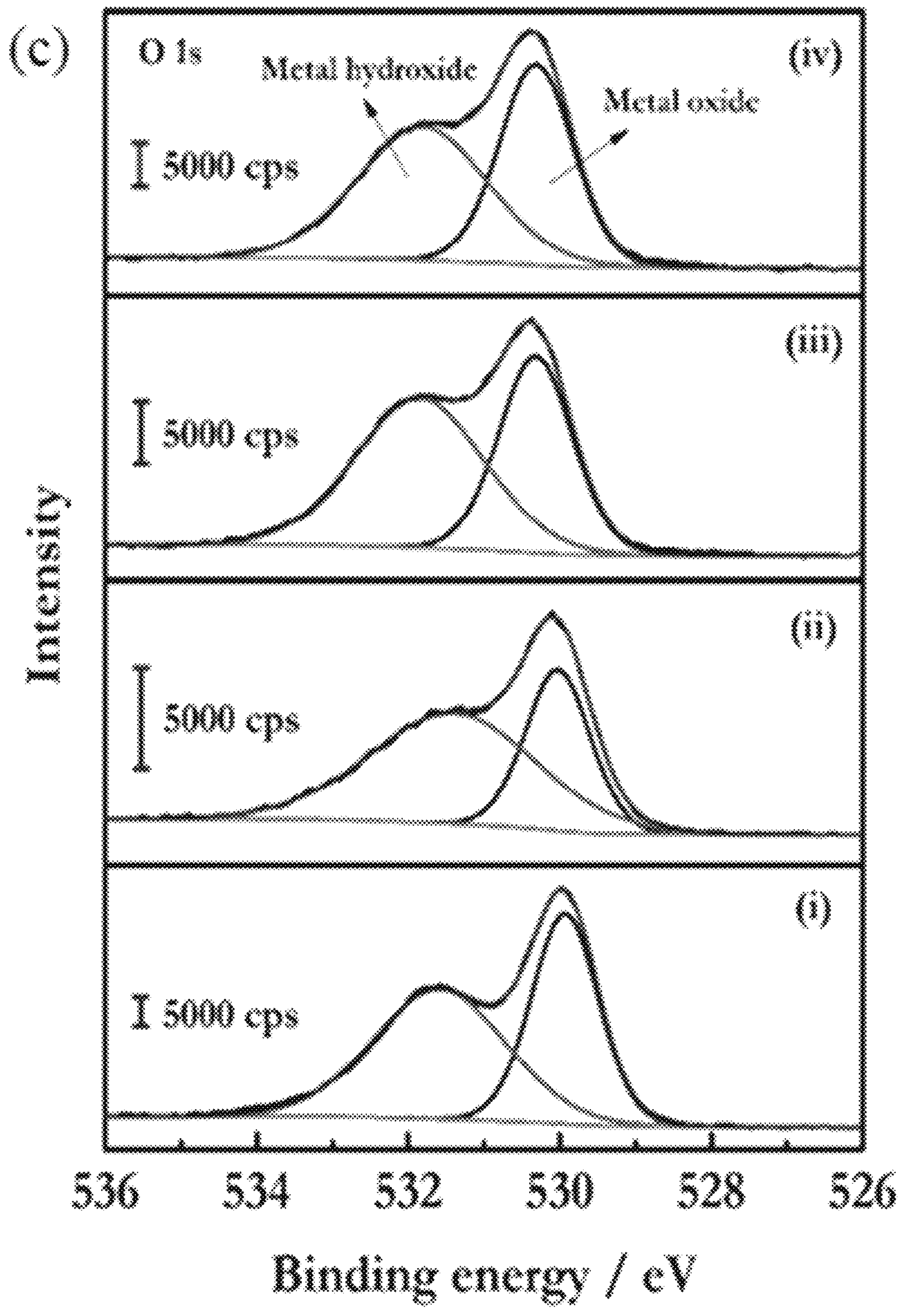

On the other hand, in FIG. 5C, the O 1s peak was clearly deconvoluted into two peaks. The peak located at ~530.3 eV corresponds to metal oxide, and ~531.7 eV represents hydroxide. As a result of comparing Fe 2p and O 1s (FIG. 5B and FIG. 5C) with each other, there was no significant change in metal oxide and hydroxide present on the surface of the metal specimen regardless of whether 6-BAP was used. In other words, even though the native oxide and hydroxide present on the surface of the polished metal specimen were immersed in a solution containing a 6-BAP inhibitor, there was no significant change in the native oxide and hydroxide.

Therefore, it was concluded that in the metal specimen to which the 6-BAP inhibitor was adsorbed, the 6-BAP may constitute a thin film that inhibits the adsorption of hydrogen atoms ($H_{ads}$), and suppresses the hydrogen formation, thereby preventing diffusion into the metal specimen.

Figure 6:
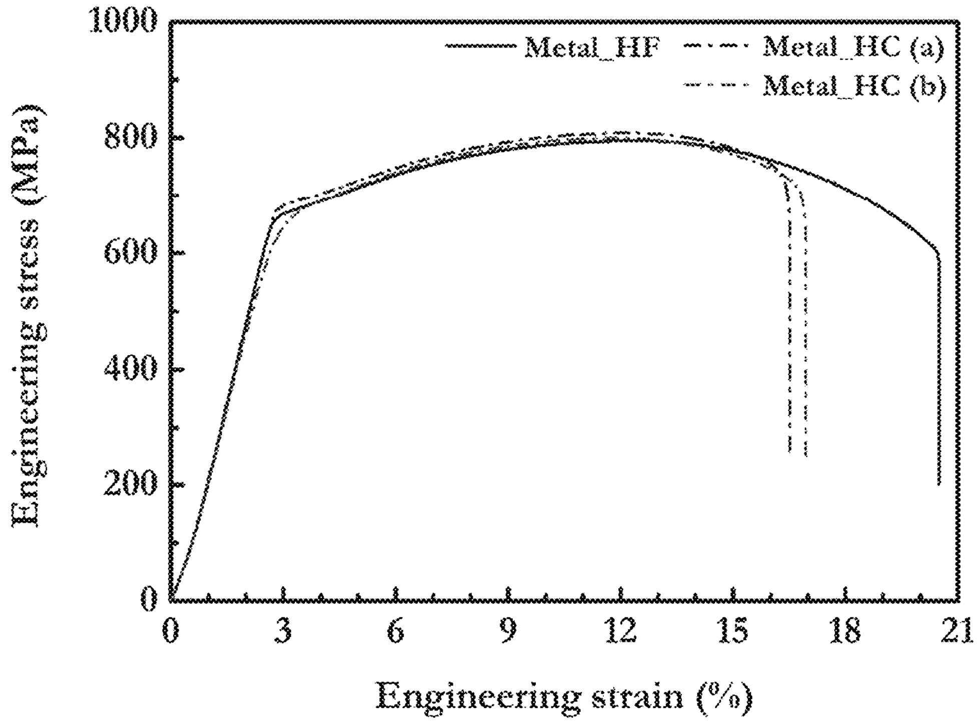
FIG. 6 is a diagram showing the results of an in-situ slow strain rate test.

FIG. 6 is a diagram showing the results of the in-situ slow strain rate test.

Referring to FIG. 6, it shows the nominal stress-strain diagram for the case where hydrogen was not charged into the metal specimen (hydrogen free, HF) and when hydrogen was charged into the metal specimen (hydrogen charged, HC). The main purpose of this test is to evaluate the effect of hydrogen on mechanical properties in the presence or absence of 6-BAP, which may be visualized through the nominal stress-strain diagram as shown in FIG. 6.

When performing SSRT without hydrogen charging, the graph shows elastic deformation, yielding, strain hardening, necking, and fracture at the necking due to reduction in the cross-sectional area. On the contrary, in the case of the in-situ SSRT with hydrogen charging, the elongation tends to decrease significantly (a and b in FIG. 6). However, in the absence of 6-BAP inhibitor, the decrease in elongation (ΔEL) was 4.2%, while in the 5 mM 6-BAP solution, the decrease in elongation was 3.4%, thus identifying that the decrease in elongation was lowered in the 5 mM 6-BAP solution (b in FIG. 6). The changes in the mechanical properties after hydrogen charging with or without 6-BAP inhibitor are summarized in Table 3 below.

Using Equation 4 above, the HE index as a quantitative value to evaluate the sensitivity to hydrogen embrittlement from the reduction of area (RoA) depending on the presence or absence of hydrogen charging was introduced.

TABLE 3

| Hydrogen condition | YS (MPa) | UTS (MPa) | EL (%) | ΔEL (%) | HE Index (%) |
|---|---|---|---|---|---|
| HF | 658 ± 2 | 795 ± 1 | 20.6 ± 0 | — | — |
| HC (0.1M NaOH) | 681 ± 1 | 816 ± 7 | 16.4 ± 0 | 4.2 | 44 ± 2 |
| HC (0.1M NaOH + 5 mM BAP) | 656 ± 13 | 808 ± 8 | 17.2 ± 0 | 3.4 | 38 ± 1 |

As may be identified in Table 3 above, when 6-BAP was not present, the HE index was 44%, whereas when 6-BAP was present, the HE index was 38%. This means that the presence of 6-BAP lowered the elongation reduction and reduced the sensitivity of the metal to hydrogen embrittlement, although the yield strength (YS) and ultimate tensile strength (UTS) were almost the same depending on HF (without hydrogen charging) and HC (hydrogen charging).

Although the description is made above with reference to preferred embodiments of the present disclosure, those skilled in the art may modify the present disclosure in various ways without departing from the spirit and scope of the present disclosure as set forth in the patent claims below.

What is claimed is:

1. A hydrogen embrittlement-inhibiting composition for coating a metal, the composition comprising 6-benzylaminopurine (6-BAP), wherein the composition inhibits diffusion of hydrogen atoms into the metal.

2. The hydrogen embrittlement-inhibiting composition for coating the metal of claim 1, wherein a content of 6-benzylaminopurine (6-BAP), is in a range of 3 to 5 mM based on a total content of the composition.

3. A metal having a hydrogen embrittlement-inhibiting coating layer formed on a surface thereof comprising:

the metal; and the hydrogen embrittlement-inhibiting coating layer formed on the surface of the metal, wherein the hydrogen embrittlement-inhibiting coating layer contains 6-benzylaminopurine (6-BAP).

4. The metal having the hydrogen embrittlement-inhibiting coating layer formed on the surface thereof of claim 3, wherein the hydrogen embrittlement-inhibiting coating layer is formed by immersing the metal in a coating solution in which the 6-BAP is added to a sodium hydroxide solvent or a methanol solvent.

5. The metal having the hydrogen embrittlement-inhibiting coating layer formed on the surface thereof of claim 4, wherein when the solvent is sodium hydroxide, the immersion is performed for 20 to 30 hours.

6. The metal having the hydrogen embrittlement-inhibiting coating layer formed on the surface thereof of claim 4, wherein when the solvent is methanol, the immersion is performed for 50 to 80 hours.

7. The metal having the hydrogen embrittlement-inhibiting coating layer formed on the surface thereof of claim 4, wherein a content of 6-BAP is in a range of 3 to 5 mM based on a total content of the coating solution.

* * * * *